US007835463B2

(12) United States Patent
Durtschi

(10) Patent No.: US 7,835,463 B2
(45) Date of Patent: *Nov. 16, 2010

(54) DIGITAL RADIO FREQUENCY MEMORY

(75) Inventor: Roger Dean Durtschi, Ridgecrest, CA (US)

(73) Assignee: The United States of America as represented by the Secretary of the Department of the Navy, Washington, DC (US)

( * ) Notice: Subject to any disclaimer, the term of this patent is extended or adjusted under 35 U.S.C. 154(b) by 733 days.

This patent is subject to a terminal disclaimer.

(21) Appl. No.: 11/801,768

(22) Filed: Apr. 26, 2007

(65) Prior Publication Data

US 2008/0266152 A1    Oct. 30, 2008

(51) Int. Cl.
*H03K 9/00* (2006.01)
(52) U.S. Cl. .................. 375/316; 375/240; 375/229; 341/110; 341/143; 341/176; 341/113; 455/313; 455/420; 455/419; 455/416; 455/415

(58) Field of Classification Search ................. 375/316, 375/240, 229; 455/313, 420, 419, 416, 415; 342/14, 13; 341/110, 143, 176, 113
See application file for complete search history.

(56) References Cited

U.S. PATENT DOCUMENTS

| 4,713,662 A * | 12/1987 | Wiegand | 342/13 |
| 4,799,189 A * | 1/1989 | Grover | 369/61 |
| 6,624,780 B1 * | 9/2003 | Fouts et al. | 342/14 |

* cited by examiner

*Primary Examiner*—Eva Y Puente
(74) *Attorney, Agent, or Firm*—Christopher L Blackburn; David S. Kalmbaugh

(57) ABSTRACT

A digital radio frequency memory (DFRM) which converts an incoming analog radio frequency signal to a fourteen bit digital signal allowing for digital signal processing and then retransmitted as an analog RF signal. The DFRM provides a time delay for RF signals by storing the signal. The DFRM also changes the signal frequency in the range of plus or minus 100,000 KHz which places a doppler on the signal. The signal phase is changed in a range of 0 to 359 degrees by the DFRM.

18 Claims, 2 Drawing Sheets

DIGITAL RADIO FREQUENCY MEMORY

BACKGROUND OF THE INVENTION

1. Field of the Invention

The present invention relates generally to processing RF signals in a digital format. More particularly, the present invention relates to a low cost digital radio frequency memory which allows an incoming RF signal to be processed digitally and then retransmitted as an analog RF signal.

2. Description of the Prior Art

A Digital Radio Frequency Memory (DFRM) system is designed to digitize an incoming RF signal at a frequency and bandwidth to adequately represent the signal and then reconstruct the RF signal when required for retransmission. Using DFRM provides for digital duplication of the received signal without the signal degradation normally associated with analog memory loops, which continuously cycle energy through a front end amplifier allowing greater range error during jamming and other applications.

In the past digital radio frequency memories relied on high speed emitter coupled logic circuits to perform the function of delaying radio frequency signals. The engineering cost associated with these high speed circuits generally make commercially available DRFM systems cost prohibitive for almost all applications, i.e. in the range of $300,000 to $400,000 per system.

Accordingly, there is a need to substantially reduce the cost of these DRFM systems to around $2500.00 per system, which makes their use cost effective.

SUMMARY OF THE INVENTION

The digital radio frequency memory of the present invention includes a 14-bit digital-to-analog converter which converts a 70 megahertz (MHz) IF analog signal to a 14-bit digital signal. The sampling rate of conversion is 100 MHz which down converts the digital signal to 30 MHz. A numerically controlled oscillator connected to a pair of mixers down-converts the digitized signal to zero hertz. The mixers also separate the digitized signal into I and Q component signals which are identical except for a ninety phase shift.

A band pass filter receives the I and Q signals and provides signals having an effective 16 MHz bandwidth. The I and Q signals are then supplied decimate by two circuit which reduces the sampling frequency from 100 MHz to 50 MHz, which allows a first-in-first-out memory (FIFO) memory to process t signals. The FIFO memory provides the signal time delay function for the I and Q signals.

Following the signal delay provided, the I and Q signals are supplied to an interpolate by four circuit within an up-converter which up converts the sampling frequency from 50 MHz to 200 MHz. An invert spectrum circuit of the upconverter compensates for an uneven number of down conversions versus up conversions. This circuit inverts the signal spectrum by the mathematical function $I \times \cos(2\pi f) - Q \times \sin(2\pi f)$ providing an output spectrum which matches the input spectrum.

A second numerically controlled oscillator connected to a second pair of mixers up-converts the digitized I and Q signal from zero hertz to seventy megahertz. A summer vectorially adds the I and Q component signals and the resulting 14-bit digital signal is re-converted into an IF analog signal. A low pass filter attenuates unwanted spectral components from the RF analog signal that exists above 80 MHz.

DETAILED DESCRIPTION OF A PREFERRED EMBODIMENT

Figure 1:
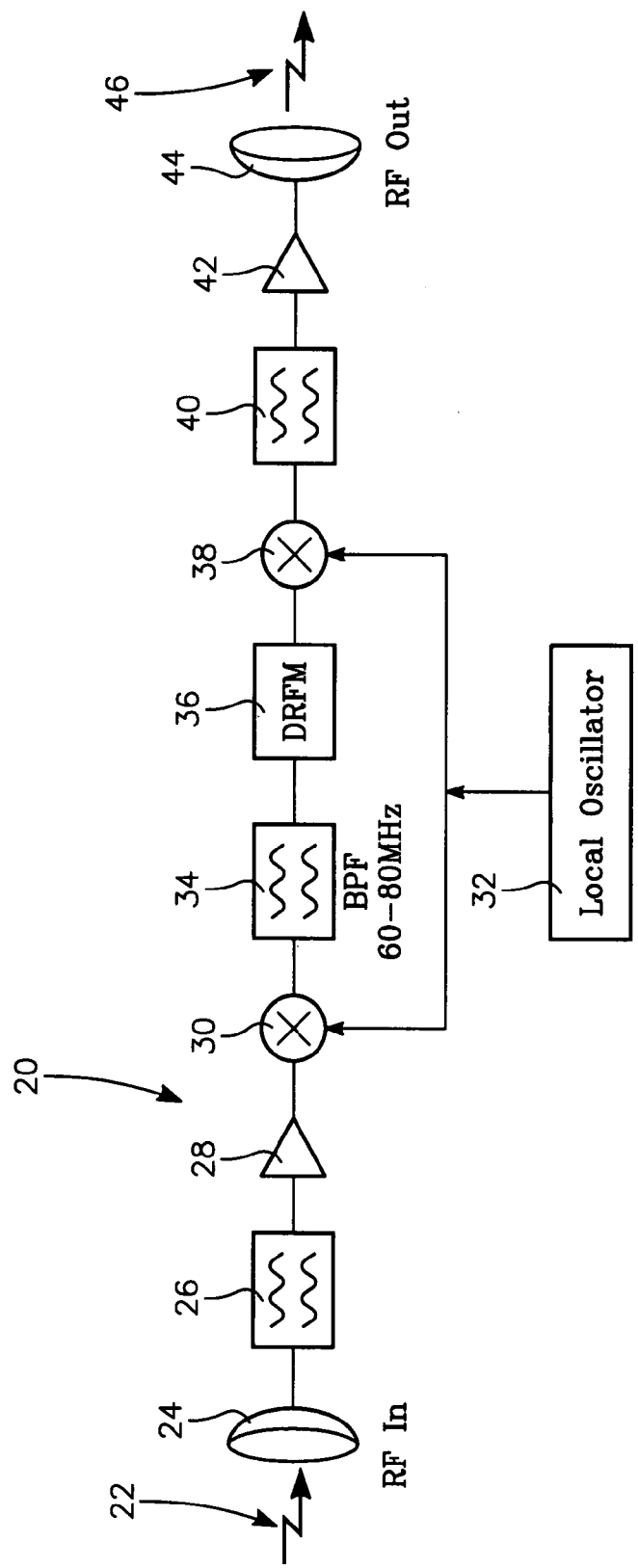
FIG. 1 is an electrical schematic diagram of an RF signal processing circuit utilizing a digital radio frequency memory.

Referring to FIG. 1, there is shown an electrical schematic diagram of an RF signal processing circuit 20 which receives an incoming RF signal 22. A microwave antenna 24 receives the incoming RF signal 22. An electrical equivalent signal of RF signal 22 is supplied by antenna 24 to a bandpass filter 26. The RF signal 22 has a frequency of 14 GHz.

Bandpass filter 26 selects a frequency which is compatible with a radar system the digital radio frequency memory is designed to operate with, passing that frequency and rejecting all other frequencies. The bandpass filter 26 has a passband of 13.9 GHz to 14.1 GHz. Connected to the output of filter 26 is an amplifier 28 which amplifies the RF electrical signal.

Mixer 30 receives the amplified RF electrical signal from amplifier 28, summing the signal with a signal generated by a Local Oscillator 32. The electrical signal output from mixer 30 has a frequency of 70 MHz, which is an IF (Intermediate Frequency) signal. For each radar system with which circuit 20 is used, the local oscillator 32 provides a local oscillator signal having a different frequency such that the electrical signal output from mixer 30 has a frequency of 70 MHz.

The 70 MHz signal output from mixer 30 is supplied to a bandpass filter 34 having a passband of 60 MHz to 80 MHz and a center frequency of 70 MHz. The output signal from filter 34 is always tuned to 70 MHz.

The 70 MHz RF signal from bandpass filter 34 is supplied to digital radio frequency memory (DFRM) 36 which converts the RF signal from analog to digital. DFRM 36 provides a time delay for RF signals by storing the signal.

DFRM 36 also changes the signal frequency in the range of plus or minus 100,000 KHz which places a doppler on the signal. The doppler makes the RF signal look like an aircraft either traveling toward or away from circuit 20 and its antenna 24. In addition, DFRM 36 changes the signal phase in the range of 0 to 359 degrees. The RF signal is reconverted to an analog format by DFRM 36 and supplied to a mixer 38. Mixer 38 is also connected to the local oscillator 32 which supplies the same signal to mixer 38 that was provided to mixer 30. Mixer 38 provides at its output a 14 GHz signal which is identical to the signal provided to mixer 30 except for the three modifications to the signal caused by DFRM 36.

The 14 GHz signal is supplied to a bandpass filter 40 which is tuned to 14 GHz and has a bandwidth of 200 MHz. An amplifier 42 is connected to the output of bandpass filter 40 and amplifies the RF electrical signal from filter 40. Microwave transmitting antenna 44 then transmits a radio frequency signal 46 with a doppler frequency shift designed to simulate an approaching or retreating aircraft.

The circuit 20 shown in FIG. 1 provides a means for simulating the RF signals from the flight of an aircraft without the cost associated with flying an aircraft. These cost can be as much as four thousand dollars an hour.

Figure 2:
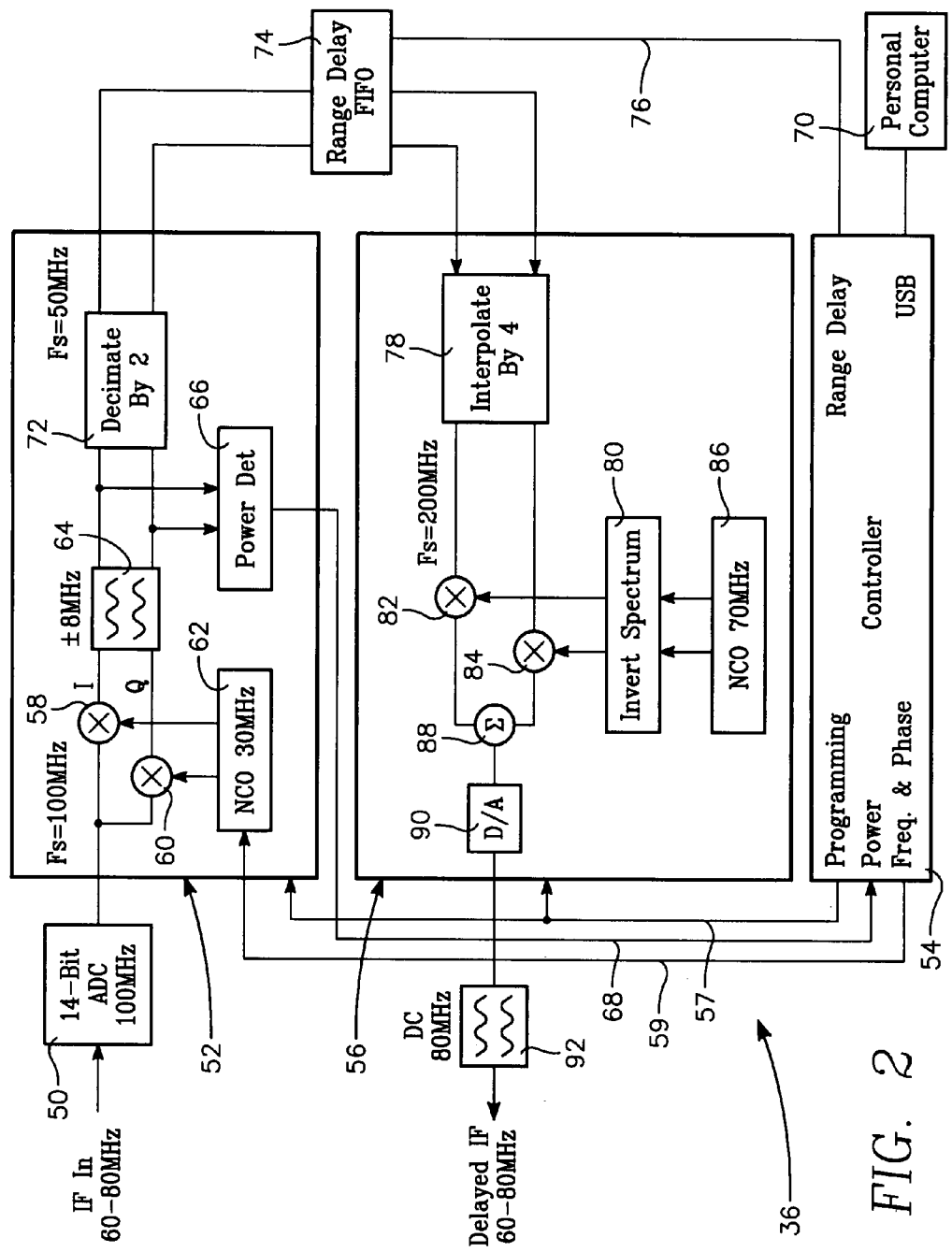
FIG. 2 illustrates a detailed electrical block diagram of the components of the digital radio frequency memory of FIG. 1.

Referring to FIGS. 1 and 2, DFRM 36 has a microcontroller 54 which is used to program a wideband receive signal processor 52 and a 14-bit quadrature digital upconverter 56. When the microcontroller 54 first powers up, the programs for wideband receive signal processor 52 and a 14-bit quadrature digital upconverter 56 are loaded into processor 52 and upconverter 56 via a programming bus 57. The programs set up the operational characteristics of processor 52 and upconverter 56 including the sample frequency, the doppler frequency, the phase shift and the range delay which are variable and depend upon the particular application for DFRM 36. Filter coefficients and gains within processor 52 and upconverter 56 are configured by microcontroller 54.

The 70 MHz IF signal from filter 34 is supplied to a 14-bit high speed Analog-to-Digital converter 50. The Analog-to-Digital converter 50 converts the incoming analog signal at a 100 MHz sample rate to a 14 bit digital signal. Converting the 70 megahertz signal at the 100 MHz sample rate down converts the to a frequency of 30 MHz. The analog to digital converter used in the preferred embodiment is a Model AD6645 14-bit, 80 MSPS/105 MSPS A/D converter commercially available from Analog Devices Inc. of Norwood, Mass.

The digitized 14 bit signal is then supplied to a pair of mixers 58 and 60 within processor 52. Mixers 58 and 60 are also connected to a 30 MHz NCO (Numerically Controlled Oscillator) 62. NCO 62 is also connected to microcontroller 54 by a transmission line 59 which allows microcontroller 54 to supply frequency and phase control signals from microcontroller 54 to NCO 62.

Mixers 58 and 60 shift one signal in phase 90 degrees with respect to the other signal, which is generally referred to as IQ complex signal processing. The signal provided by mixer 60 (Q signal) is shifted ninety degrees with respect to the I signal from mixer 58.

Mixers 58 and 60 also receive a 30 MHz input signal from NCO 62 which down converts the digitized input signals to mixers 58 and 60 to a DC level or baseband level. The I and Q signals from mixers 58 and 60 have a bandwidth of 20 MHz resulting in signals that having a positive frequency (0 to +10 MHz) and a negative frequency (0 to −10 MHz). A low pass filter 64 connected to the outputs of mixers 58 and 60 filters the I and Q signals such that the signals have frequency range of ±8 MHz. Since the IF carrier frequency is now zero hertz, the 8 MHz low pass filter 64 provides a sixteen megahertz bandwidth since both in-phase and quadrature signals are processed.

The amplitude of the I and Q signals are sampled by a power detector 66 with sampling data being sent to the microcontroller 54 via a data transmission line 68 for display on the monitor of personal computer 70. The I and Q signals are also supplied to a decimate by two circuit 72 which reduces the sample rate from 100 MHz to 50 MHz without losing information. The wideband receive signal processor 52 used in the preferred embodiment is a Model AD6636 150 MSPS Wideband (Digital) Receive Signal Processor commercially available from Analog Devices.

The decimate by two circuit 72, which creates a sample frequency of 50 MHz, is required because Range Delay FIFO memory 74 is designed to operate at a sample rate of approximately 50 MHz. The digitized signal is stored in FIFO memory 74. A range delay line 76 connects microcontroller 54 to FIFO memory 74. The microcontroller 54 controls range delay which can be changed every ten microseconds. The signals are also being sent from decimate by two circuit 72 to FIFO memory 74 at a sample rate of 50 MHz, which translates into a delay resolution of 20 nanoseconds. This is equivalent to an aircraft range step of approximately 10 feet. These delays within DFRM 36 allow a user to simulate an aircraft flying toward microwave antenna 24 and away from antenna 24. By manipulating time delays between transmission of radar signal 46 and reception of return signal 22, DFRM 46 effectively simulates aircraft movement by either increasing round trip time for the radar signal or decreasing round trip time for the radar signal.

Both speed and direction of the aircraft can be modified by changing range delay steps using microcontroller 54 to effect the range delay step changes and by changing the frequency and phase of NCO 62. Microsecond control of range delay steps is required to simulate a variety of aircraft speeds. The range delay step for DFRM 36 is twenty nano-seconds.

For the purpose of illustration one pulse supplied to FIFO memory 74 by microcontroller 52 will delay the signal from FIFO memory 74 by one fifty megahertz period. This simulates an aircraft traveling at relatively slow speeds. Two pulses in a given period will simulate an aircraft traveling at a slightly higher speed, and three to several hundred pulses during the period will simulate aircraft traveling at even higher speeds.

Updates to the FIFO memory 74 from the range delay pulse occur at the radar pulse repetition frequency for the radar being simulated.

The FIFO memory 74 used in the preferred embodiment is a Model 72V293L6 PF FIFO memory commercially available from IDT corporation of San Jose, Calif. The microcontroller 54 used in the preferred embodiment is a Model PIC18F8722 microcontroller commercially available from Microchip Technology of Chandler, Ariz.

The digitized signal outputs from the FIFO memory 74 are supplied to 14-bit quadrature digital upconverter 56. The upconverter 56 used in the preferred embodiment of the invention is a Model AD9857 CMOS 200 MSPS 14-Bit Quadrature Digital Upconverter commercially available from Analog Devices.

Upconverter 56 includes an interpolate by four circuit 78 generates a sample frequency of 200 MHz which results in a 50 MHz input signal having a sample frequency of 200 MHz at the output of interpolate by four circuit 78. The invert spectrum circuit 80 of upconverter 56 compensates for an uneven number of down conversions versus up conversions.

Analog-to-Digital converter 50, which uses super nyquist sampling to down convert the 70 MHz signal to 30 MHz is a first down conversion. The mixers 58 and 60 are a second down conversion. However, there is only one up conversion which is performed by mixers 82 and 84. The invert spectrum circuit 80 causes an NCO 86 to output a signal of the form cos θ+j sin 6, which causes the signal to have a vector rotating in the same direction as the signal input to DFRM 36.

The 70 MHz NCO 86, which is connected through circuit 80 to mixers 82 and 84 supplies mixers 82 and 84 with a 70 MHz signal. The I and Q signals from invert spectrum circuit 80 are centered at DC or baseband. Mixers 82 and 84 converts the I and Q signals to IF signals centered at 70 MHz signals. The IF signals are then vectorially added together by a summer 88 with the resulting signal being supplied to a 14-bit digital-to-analog converter 90. A 70 MHz analog signal output from digital-to-analog converter 90 is supplied to an 82.5 MHz Elliptic LP (low pass) filter 92. Filter 92 selectively passes the 70 MHz signal attenuating spurs and harmonics that are outside of the signal.

From the foregoing, it is readily apparent that the present invention comprises a new, unique and exceedingly useful digital radio frequency memory for use in simulating aircraft flight, which constitutes a considerable improvement over the known prior art. Obviously, many modifications and variations of the present invention are possible in light of the above teachings. It is therefore to be understood that within the scope of the appended claims that the invention may be practiced otherwise than as specifically described.

What is claimed is:

1. A digital radio frequency memory comprising:
   (a) an analog-to-digital converter for receiving and converting a first IF signal having a frequency of approximately 70 MHz to a 14-bit digital signal, wherein said first IF signal is converted to said 14-bit digital signal at a sampling rate of approximately 100 MHz which down-converts said 14-bit digital signal to a frequency of approximately 30 MHz;
   (b) a wideband receive signal processor for receiving said 14-bit digital signal from said analog-to-digital converter, separating said 14-bit digital signal into I and Q component signals having a frequency of zero hertz and phase shifting said I and Q component signals by ninety degrees with respect to each other;
   (c) said wideband receive signal processor including a decimate by two circuit for dividing said sampling rate of approximately 100 MHz by a factor of two which produces a sample frequency of approximately 50 MHz;
   (d) a first-in-first-out (FIFO) memory for providing a signal time delay by storing said I and Q component signals at said sample frequency of approximately 50 MHz;
   (e) a digital upconverter for receiving said I and Q component signals from said FIFO memory after said signal time delay occurs and up-converting said sample frequency of approximately 50 MHz to a sample frequency of approximately 200 MHz;
   (f) said digital upconverter up-converting said I and Q component signals from said frequency of zero hertz to said frequency of approximately 70 MHz and vectorially adding said I and Q component signals to regenerate said 14-bit digital signal which is delayed by said signal time delay provided by said FIFO memory; and
   (g) said digital upconverter including a digital-to-analog converter for converting said 14-bit digital signal to a second IF signal which is equivalent to said first IF signal and is delayed by said signal time delay provided by said FIFO memory.

2. The digital radio frequency memory of claim 1 further comprising a low pass filter connected to the digital-to-analog converter of said digital upconverter, said low pass filter attenuating spurs and harmonics that are outside of the frequency of approximately 70 MHz of said second IF signal.

3. The digital radio frequency memory of claim 1 wherein said digital upconverter includes an invert spectrum circuit for compensating for an uneven number of down-conversion of said I and Q component signals performed by said analog-to-digital converter and said wideband receive signal processor when compared to the number of up-conversions of said I and Q component signals performed by said upconverter.

4. The digital radio frequency memory of claim 1 further comprising a microcontroller connected to said wideband signal receive processor, said digital upconverter and said FIFO memory.

5. The digital radio frequency memory of claim 4 wherein said microcontroller downloads programs into said wideband receive signal processor and said digital upconverter via a programming bus, said programs setting up operational characteristics for said wideband receive signal processor and said digital upconverter including sample frequency, doppler frequency, and phase shift.

6. The digital radio frequency memory of claim 4 wherein said microcontroller provides a range delay signal to said FIFO memory which results in said FIFO memory providing for said signal time delay of said I and Q component signals by storing said I and Q component signals within said FIFO memory.

7. The digital radio frequency memory of claim 1 wherein said sample frequency of approximately 50 MHz for said FIFO memory translates into a delay resolution of 20 nanoseconds which is equivalent to an aircraft range step of approximately 10 feet allowing a user of said digital radio frequency memory to simulate an aircraft flying toward a microwave antenna associated with said digital radio frequency memory and away from said microwave antenna associated with said digital radio frequency memory.

8. A digital radio frequency memory comprising:
   (a) an analog-to-digital converter for receiving and converting a first IF signal having a frequency of approximately 70 MHz to a 14-bit digital signal, wherein said first IF signal is converted to said 14-bit digital signal at a sampling rate of approximately 100 MHz which down-converts said 14-bit digital signal to a frequency of approximately 30 MHz;
   (b) a first pair of mixers for separating said 14-bit digital signal into I and Q component signals, wherein said first pair of mixers down-converts said I and Q component signals to a frequency of zero hertz and phase shifts said I and Q component signals by ninety degrees with respect to each other;
   (c) a decimate by two circuit for dividing said sampling rate of approximately 100 MHz by a factor of two which produces a sample frequency of approximately 50 MHz;
   (d) a first-in-first-out (FIFO) memory for providing a signal time delay by storing said I and Q component signals at said sample frequency of approximately 50 MHz;
   (e) an interpolate by four circuit for receiving said I and Q component signals from said FIFO memory after said signal time delay occurs, said interpolate by four circuit up-converting said sample frequency of approximately 50 MHz to a sample frequency of approximately 200 MHz;
   (f) a second of pair of mixers for up-converting said I and Q component signals from said frequency of zero hertz to said frequency of approximately 70 MHz;
   (g) an invert spectrum circuit for compensating for an uneven number of down-conversion of said I and Q component signals when compared to the number of up-conversions of said I and Q component signals;
   (h) a summer for receiving said I and Q component signals from said second pair of mixers and then vectorially adding said I and Q component signals to regenerate said 14-bit digital signal which is delayed by said signal time delay provided by said FIFO memory; and
   (i) a digital-to-analog converter for receiving said 14-bit digital signal from said summer and converting said 14-bit digital signal to a second IF signal which is equivalent to said first IF signal and is delayed by said signal time delay provided by said FIFO memory.

9. The digital radio frequency memory of claim 8 further comprising a low pass filter connected to said digital-to-analog converter, said low pass filter attenuating spurs and harmonics that are outside of the frequency of approximately 70 MHz of said second IF signal.

10. The digital radio frequency memory of claim 8 further comprising a first numerically controlled oscillator connected to said first pair of mixers, wherein said first numerically controlled oscillator provides a 30 MHz signal to said first pair of mixers which, in response to said 30 MHz signal, down-converts said I and Q component signals to said frequency of zero hertz.

11. The digital radio frequency memory of claim 10 further comprising a second numerically controlled oscillator for providing a 70 MHz signal to said second pair of mixers which, in response to said 70 MHz signal, up-converts said I and Q component signals to said frequency of said frequency of approximately 70 MHz.

12. The digital radio frequency memory of claim 10 further comprising a microcontroller connected to said first numerically controlled oscillator, wherein said microcontroller programs said first numerically controlled oscillator to provide said 30 MHz signal to said first pair of mixers.

13. The digital radio frequency memory of claim 8 further comprising a microcontroller connected to said FIFO memory wherein said microcontroller programs said FIFO memory using a range delay signal which results in said FIFO memory providing for said signal time delay of said I and Q component signals by storing said I and Q component signals within said FIFO memory.

14. The digital radio frequency memory of claim 8 wherein said sample frequency of approximately 50 MHz for said FIFO memory translates into a delay resolution of 20 nanoseconds which is equivalent to an aircraft range step of approximately 10 feet allowing a user of said digital radio frequency memory to simulate an aircraft flying toward a microwave antenna associated with said digital radio frequency memory and away from said microwave antenna associated with said digital radio frequency memory.

15. The digital radio frequency memory of claim 8 further comprising a low pass filter connected to said first pair of mixers, said low pass filter attenuating said I and Q component signals such that said I and Q component signals have a bandwidth of approximately 16 MHz.

16. The digital radio frequency memory of claim 15 further comprising a power detector connected to said low pass filter, said power detector sampling the amplitude of said I and Q component signals from said low pass filter.

17. The digital radio frequency memory of claim 15 further comprising a personal computer having a monitor for viewing the amplitude of the I and Q component signals sampled by said power detector.

18. A digital radio frequency memory comprising:
(a) an analog-to-digital converter for receiving and converting a first IF signal having a frequency of approximately 70 MHz to a 14-bit digital signal, wherein said first IF signal is converted to said 14-bit digital signal at a sampling rate of approximately 100 MHz which down-converts said 14-bit digital signal to a frequency of approximately 30 MHz;
(b) a first pair of mixers for separating said 14-bit digital signal into I and Q component signals, wherein said first pair of mixers down-converts said I and Q component signals to a frequency of zero hertz and phase shifts said I and Q component signals by ninety degrees with respect to each other;
(c) a first numerically controlled oscillator connected to said first pair of mixers, wherein said first numerically controlled oscillator provides a 30 MHz signal to said first pair of mixers which, in response to said 30 MHz signal, down-converts said I and Q component signals to said frequency of zero hertz
(d) a decimate by two circuit for dividing said sampling rate of approximately 100 MHz by a factor of two which produces a sample frequency of approximately 50 MHz;
(e) a first-in-first-out (FIFO) memory for providing a signal time delay by storing said I and Q component signals at said sample frequency of approximately 50 MHz;
(f) an interpolate by four circuit for receiving said I and Q component signals from said FIFO memory after said signal time delay occurs, said interpolate by four circuit up-converting said sample frequency of approximately 50 MHz to a sample frequency of approximately 200 MHz;
(g) a second pair of mixers for up-converting said I and Q component signals from said frequency of zero hertz to said frequency of approximately 70 MHz;
(h) a second numerically controlled oscillator connected to said second pair of mixers for providing a 70 MHz signal to said second pair of mixers which, in response to said 70 MHz signal, up-converts said I and Q component signals to said frequency of said frequency of approximately 70 MHz;
(i) an invert spectrum circuit for compensating for an uneven number of down-conversion of said I and Q component signals when compared to the number of up-conversions of said I and Q component signals;
(j) a summer for receiving said I and Q component signals from said second pair of mixers and then vectorially adding said I and Q component signals to regenerate said 14-bit digital signal which is delayed by said signal time delay provided by said FIFO memory; and
(k) a digital-to-analog converter for receiving said 14-bit digital signal from said summer and converting said 14-bit digital signal to a second IF signal which is equivalent to said first IF signal and is delayed by said signal time delay provided by said FIFO memory;
(l) a low pass filter connected to said digital-to-analog converter, said low pass filter attenuating spurs and harmonics that are outside of the frequency of approximately 70 MHz of said second IF signal; and
(m) a microcontroller connected to said first numerically controlled oscillator and said FIFO memory, wherein said microcontroller programs said first numerically controlled oscillator to provide said 30 MHz signal to said first pair of mixers, said microcontroller programs said FIFO memory using a range delay signal which results in said FIFO memory providing for said signal time delay of said I and Q component signals by storing said I and Q component signals within said FIFO memory.

* * * * *